(12) United States Patent
Chowdhury

(10) Patent No.: US 11,940,996 B2
(45) Date of Patent: Mar. 26, 2024

(54) UNSUPERVISED DISCRIMINATIVE FACET GENERATION FOR DYNAMIC FACETED SEARCH

(71) Applicant: International Business Machines Corporation, Armonk, NY (US)

(72) Inventor: Md Faisal Mahbub Chowdhury, Woodside, NY (US)

(73) Assignee: International Business Machines Corporation, Armonk, NY (US)

(*) Notice: Subject to any disclaimer, the term of this patent is extended or adjusted under 35 U.S.C. 154(b) by 227 days.

(21) Appl. No.: 17/134,271

(22) Filed: Dec. 26, 2020

(65) Prior Publication Data

US 2022/0207030 A1    Jun. 30, 2022

(51) Int. Cl.
  *G06F 16/242*  (2019.01)
  *G06N 20/00*  (2019.01)

(52) U.S. Cl.
  CPC ......... *G06F 16/2423* (2019.01); *G06N 20/00* (2019.01)

(58) Field of Classification Search
  None
  See application file for complete search history.

(56) References Cited

U.S. PATENT DOCUMENTS

| | | | |
|---|---|---|---|
| 6,006,222 A * | 12/1999 | Culliss ................. | G06F 16/951 707/999.005 |
| 7,137,062 B2 | 11/2006 | Kaufman et al. | |
| 7,603,348 B2 | 10/2009 | He et al. | |
| 8,214,361 B1 | 7/2012 | Sandler et al. | |
| 8,391,618 B1 | 3/2013 | Chuang | |
| 8,983,930 B2 | 3/2015 | Cheng et al. | |
| 9,037,579 B2 | 5/2015 | Pasumarthi et al. | |
| 9,183,288 B2 | 11/2015 | Murray | |
| 9,372,606 B2 | 6/2016 | Scherpa et al. | |
| 9,715,493 B2 | 7/2017 | Papadopoullos | |
| 10,042,880 B1 * | 8/2018 | Bodapati ............... | G06F 40/137 |
| 10,242,103 B2 | 3/2019 | Bivens et al. | |
| 10,262,068 B2 | 4/2019 | Gungor et al. | |
| 10,373,075 B2 | 8/2019 | Wu | |
| 10,430,465 B2 | 10/2019 | Freed et al. | |

(Continued)

FOREIGN PATENT DOCUMENTS

KR    2009-0063801 A  *  6/2009

OTHER PUBLICATIONS

Peter Mell and Timothy Grance, The NIST Definition of Cloud Computing, NIST Special Publication 800-145, cover, pp. i-iii, 1-3, Sep. 2011.

(Continued)

*Primary Examiner* — Augustine K. Obisesan
(74) *Attorney, Agent, or Firm* — Caleb Wilkes; Otterstedt & Kammer PLLC

(57) ABSTRACT

With a computerized search engine, retrieve a plurality of electronic documents relevant to a query. Obtaining, via computerized term embedding, from the retrieved documents, a plurality of most similar terms with respect to the query. For each of the most similar terms, determine a pervasiveness score and a relevance score. Filter out, from the most similar terms, those of the terms that are pervasive, based on the pervasiveness score, those of the terms that are irrelevant, based on the relevance score, and those of the terms that are redundant. Output a top number of terms remaining in the most similar terms after the filtering, based on similarity to the query, as discriminative facets.

18 Claims, 12 Drawing Sheets

(56) References Cited

U.S. PATENT DOCUMENTS

| | | | |
|---|---|---|---|
| 10,572,560 B2 | 2/2020 | Bei et al. | |
| 10,733,211 B2 | 8/2020 | Breno | |
| 11,176,189 B1 | 11/2021 | Hohwald | |
| 2002/0103799 A1* | 8/2002 | Bradford | G06F 16/3346 |
| 2005/0038781 A1 | 2/2005 | Ferrari | |
| 2006/0004814 A1* | 1/2006 | Lawrence | G06Q 40/025 |
| 2007/0174865 A1* | 7/2007 | Jing | H04N 21/4756 725/28 |
| 2008/0172375 A1 | 7/2008 | Burges | |
| 2009/0187555 A1* | 7/2009 | Liu | G06F 16/334 707/999.005 |
| 2010/0293175 A1 | 11/2010 | Vadrevu | |
| 2011/0078205 A1 | 3/2011 | Salkeld | |
| 2011/0125764 A1 | 5/2011 | Carmel et al. | |
| 2011/0131157 A1 | 6/2011 | Iyer | |
| 2011/0246456 A1 | 10/2011 | Weitz | |
| 2012/0203717 A1 | 8/2012 | Xu | |
| 2012/0226681 A1 | 9/2012 | Paparizos et al. | |
| 2013/0226916 A1 | 8/2013 | Dredze et al. | |
| 2014/0201180 A1* | 7/2014 | Fatourechi | G06F 16/951 707/706 |
| 2014/0207746 A1 | 7/2014 | Song | |
| 2014/0330804 A1 | 11/2014 | Bao | |
| 2017/0024394 A1* | 1/2017 | Kim | H04L 67/535 |
| 2017/0140053 A1 | 5/2017 | Vorobev | |
| 2017/0148078 A1 | 5/2017 | Agarwal | |
| 2017/0221120 A1 | 8/2017 | Pathak | |
| 2017/0308535 A1 | 10/2017 | Agarwal | |
| 2017/0364596 A1 | 12/2017 | Wu | |
| 2018/0101616 A1 | 4/2018 | Ma | |
| 2018/0232434 A1 | 8/2018 | Geyik | |
| 2018/0232449 A1 | 8/2018 | Bivens | |
| 2018/0232450 A1 | 8/2018 | Bivens | |
| 2018/0232702 A1 | 8/2018 | Dialani | |
| 2019/0065584 A1 | 2/2019 | Fukuda et al. | |
| 2019/0114325 A1 | 4/2019 | Zaki et al. | |
| 2019/0205445 A1 | 7/2019 | Yazdani | |
| 2019/0258722 A1 | 8/2019 | Guo | |
| 2019/0294705 A1 | 9/2019 | Kumar | |
| 2019/0362025 A1 | 11/2019 | Zhou et al. | |
| 2019/0392077 A1 | 12/2019 | Kikuchi et al. | |
| 2020/0004886 A1 | 1/2020 | Ramanath | |
| 2020/0005218 A1 | 1/2020 | Cheung et al. | |
| 2020/0097531 A1 | 3/2020 | Kajinaga et al. | |
| 2020/0201848 A1 | 6/2020 | Srinivasan | |
| 2020/0265491 A1 | 8/2020 | Young | |
| 2020/0311092 A1* | 10/2020 | Thomas | G09B 7/02 |
| 2020/0349179 A1 | 11/2020 | Kong | |
| 2020/0349203 A1 | 11/2020 | Kong | |
| 2020/0401627 A1 | 12/2020 | Liu | |
| 2021/0157856 A1 | 5/2021 | Tsuzuku | |
| 2021/0319033 A1 | 10/2021 | Zhang | |
| 2021/0326346 A1 | 10/2021 | Rivlin | |
| 2021/0349954 A1 | 11/2021 | Renders | |
| 2022/0083559 A1 | 3/2022 | Chowdhury | |
| 2022/0197916 A1 | 6/2022 | Sarkar | |
| 2022/0207087 A1 | 6/2022 | Glass | |

OTHER PUBLICATIONS

Vandic et al., Dynamic Facet Ordering For Faceted Product Search Engines, IEEE Transactions on Knowledge and Data Engineering. Jan. 16, 2017;29(5):1004-16.

Dash et al.; "Dynamic Faceted Search for Discovery-Driven Analysis", CIKM'08 17th ACM Conference On, pp. 3-12, Oct. 26-30, 2008.

Pasha et al.; "Dynamic ordering of Facets for E-Commerce Industries", IJSDR International Journal, vol. 3, Issue 5, pp. 595-607, May 2018.

Roy et al.; "DynaCet: Building Dynamic Faceted Search Systems Over Databases", ICDE IEEE 25th International Conference On, pp. 1463-1466, Mar. 29-Apr. 2, 2009.

Chowdhury MF, Farrell R. An efficient approach for super and nested term indexing and retrieval. arXiv preprint arXiv:1905.09761. May 23, 2019. 5 pages.

Paul J. Otterstedt, List of IBM Patents or Patent Applications Treated as Related, 2 pages Mar. 6, 2023.

Zhang C, Tao F, Chen X, Shen J, Jiang M, Sadler B, Vanni M, Han J. Taxogen: Unsupervised topic taxonomy construction by adaptive term embedding and clustering. InProceedings of the 24th ACM SIGKDD International Conference on Knowledge Discovery & Data Mining Jul. 19, 2018 (pp. 2701-2709).

Agnes van Belle, Berlin Buzzwords, 2017, 48 pages.

Feddoul L, Schindler S, Löffler F. Automatic facet generation and selection over knowledge graphs. InSemantic Systems. The Power of AI and Knowledge Graphs: 15th International Conference, SEMANTICS 2019, Karlsruhe, Germany, Sep. 9-12, 2019, Proceedings 15 2019 (pp. 310-325). Springer International Publishing.

Manioudakis K, Tzitzikas Y. Extending faceted search with automated object ranking. InMetadata and Semantic Research: 13th International Conference, MTSR 2019, Rome, Italy, Oct. 28-31, 2019, Revised Selected Papers 2019 (pp. 223-235). Springer International Publishing.

Bashir S, Afzal W, Baig AR. Opinion-Based Entity Ranking using learning to rank. Applied Soft Computing. Jan. 1, 2016;38:151-63.

Lawless, Seamus. "Entity attribute ranking using learning to rank." (2017). 6 pages.

Kang C, Yin D, Zhang R, Torzec N, He J, Chang Y. Learning to rank related entities in web search. Neurocomputing. Oct. 20, 2015;166:309-18.

Senjuti Basu Roy, Haidong Wang, Gautam Das, Ullas Nambiar, and Mukesh Mohania. 2008. Minimum-effort driven dynamic faceted search in structured databases. pp. 13-22, 01.

Ben-Yitzhak O, Golbandi N, Har'El N, Lempel R, Neumann A, Ofek-Koifman S, Sheinwald D, Shekita E, Sznajder B, Yogev S. Beyond basic faceted search. InProceedings of the 2008 international conference on web search and data mining Feb. 11, 2008 (pp. 33-44).

Dakka W, Ipeirotis PG. Automatic extraction of useful facet hierarchies from text databases. In2008 IEEE 24th International Conference on Data Engineering Apr. 7, 2008 (pp. 466-475). IEEE.

Kelly D. Methods for evaluating interactive information retrieval systems with users. Foundations and Trends® in Information Retrieval. Apr. 27, 2009;3(1-2):1-224. (Abstract only 2 pages).

Zhang Y, Liu X, Zhai C. Information retrieval evaluation as search simulation: A general formal framework for ir evaluation. InProceedings of the ACM SIGIR International Conference on Theory of Information Retrieval Oct. 1, 2017 (pp. 193-200).

Cranfield experiments—Wikipedia, downloaded Mar. 6, 2023 from https://en.wikipedia.org/wiki/Cranfield_experiments 5 pages.

Okapi BM25, Wikipedia, downloaded Mar. 6, 2023 from https://en.wikipedia.org/wiki/Okapi_BM25, 3 pages.

Anonymous, How is hits@k calculated and what does it mean in the context of link prediction in knowledge bases, downloaded Mar. 6, 2023 from https://stackoverflow.com/questions/58796367/how-is-hitsk-calculated-and-what-does-it-mean-in-the-context-of-link-prediction#:~:text=In%20a%20nutshell%2C%20it%20is,a%20bunch%20of%20synthetic%20negatives. 2 pages.

Discounted cumulative gain, Wikipedia, downloaded from https://en.wikipedia.org/wiki/Discounted_cumulative_gain Mar. 6, 2023 5 pages.

Anonymous, How to use word2vec to calculate the similarity distance by giving 2 words?, downloaded Mar. 6, 2023 from https://stackoverflow.com/questions/21979970/how-to-use-word2vec-to-calculate-the-similarity-distance-by-giving-2-words 4 pages.

Anonymous, What is Elasticsearch?, downloaded from https://www.elastic.co/what-is/elasticsearch Mar. 6, 2023 6 pages.

Anju et al.; "Dynamically Building Facets From Their Search Results", IJEAT Journal Of, vol. 6, Issue 5, pp. 2249-2253, Jun. 2017.

Latha et al.; "A Dynamic Feature Selection Method for Document Ranking With Relevance Feedback Approach", ICTACT Journal on Soft Computing, vol. 1, Iss. 1 ,pp. 1-8, Jul. 2010.

Affolter et al.; "FacetX: Dynamic Facet Generation for Advanced Information Filtering of Search Results", EDBT/ICDT Workshop On, pp. 1-4, Mar. 30-Apr. 2, 2020.

(56) References Cited

OTHER PUBLICATIONS

Jiang et al.; "Generating Query Facets Using Knowledge Bases", TKDE IEEE Transactions On, vol. 29, Iss. 2, pp. 315-329, Feb. 1, 2017.

Lykke et al.; "Physicists' Information Tasks: Structure, Length and Retrieval Performance", IIiX'10 ACM Symposium On, pp. 1-6, Aug. 18-21, 2010.

Ali et al., Entity attribute ranking using learning to rank. InKG4IR@SIGIR 2017 (pp. 19-24) http://www.tara.tcd.ie/bitstream/handle/2262/82720/3.pdf?sequence=3.

\* cited by examiner

FIG. 3

```
VEHICLES              {1, 4, 5, 7, 8, 10, 11, 12, 13, 14, 15, 16, 20, 25,
                       35, 37, 40}
AUTONOMOUS_VEHICLES   {1, [3], 4, 5, [6], 7, 8, 10, 12, 14,
                       15, 16, 20, [21], [22], [23], [28], [29], [32], [38], [49]}
DRIVING_VEHICLES      {[2], [3], 4, 7, 10, 11, 15, [18], 20, [49]}
```

FIG. 4

```
VEHICLES   {1, 2, 3, 4, 5, 6, 7, 8, 10, 11, 12, 13, 14, 15,
            16, 18, 20, 21, 22, 23, 25, 28, 29, 32, 35, 37, 38, 40, 49}
```

$$E(DCG) = \sum_{i=0}^{n} \frac{P(rel_i)}{\log_2(1 + R_i^{min})}$$

| METHOD | FS SIMULATOR | | SIMULATOR | |
|---|---|---|---|---|
| | DCG | MRR | DCG | MRR |
| INITIAL RESULTS | 0.184 | 0.130 | 0.184 | 0.130 |
| TOP 5 BY SIMILARITY TO QUERY | 0.242 | 0.200 | 0.214 | 0.147 |
| OPTIMISTIC FACET SET SELECTION | 0.293 | 0.264 | 0.223 | 0.158 |

FIG. 10

| Algorithm 1 Greedy and Local Search Facet Set Selection |
|---|
| Best($C, F, f^*, s^*$)                    Greedy($C, k$)                         LocalSearch($C, F, s^*$) |
|   for $f$ in $C - F$ do              $F \leftarrow \emptyset$                            repeat |
|     $s \leftarrow \mathbb{E}(DCG_{F \cup \{f\}})$    for $i \leftarrow 1$ through $k$ do      $s_0 \leftarrow s^*$ |
|     if $s > s^*$ then             $f^*, s^* \leftarrow$ Best($C, F, \emptyset, -\infty$)      for $f_0$ in $F$ do |
|       $f^* \leftarrow f$              $F \leftarrow F \cup \{f^*\}$                        $F \leftarrow F / f_0$ |
|       $s^* \leftarrow s$            end for                                    $f^*, s^* \leftarrow$ Best($C, F, f_0, s^*$) |
|     end if                    return $F, s^*$                             $F \leftarrow F \cup \{f^*\}$ |
|   end for                                                                    end for |
|   return $f^*, s^*$                                                         until $s^* = s_0$ |

FIG. 12

| Metric | FIRST DATASET | | | | SECOND DATASET | | | |
|---|---|---|---|---|---|---|---|---|
| | (no DFS) | Sim. DFS | Discr. DFS | Optim. DFS | (no DFS) | Sim. DFS | Discr. DFS | Optim. DFS |
| DCG | 0.30 | 0.33 | 0.34 | 0.39 | 0.18 | 0.24 | 0.25 | 0.29 |
| MRR | 0.34 | 0.37 | 0.38 | 0.42 | 0.13 | 0.20 | 0.21 | 0.26 |
| Hits@1 | 217 (35.5%) | 250 (40.9%) | 252 (41.3%) | 322 (52.7%) | 75 (8.5%) | 144 (16.3%) | 149 (16.9%) | 205 (23.2%) |
| Hits@5 | 320 (52.4%) | 348 (57.0%) | 355 (58.2%) | 377 (61.8%) | 153 (17.3%) | 228 (25.8%) | 226 (25.6%) | 260 (29.4%) |
| Hits@10 | 348 (57.0%) | 377 (61.8%) | 380 (62.3%) | 394 (64.6%) | 200 (22.7%) | 261 (29.6%) | 266 (30.1%) | 293 (33.2%) |

FIG. 13

| User Query | Top 5 Dynamically Generated Facets | Additional Relevant Facets Present in Post | SME Recommended Facets |
|---|---|---|---|
| What are the differences between scm adapter and CCRC eclipse plugin? | ClearCase Remote Client, *Rational ClearCase SCM Adapter*, dynamic views, *rad, source control* | Eclipse SCM adapter | CCRC plugin, ClearCase perspective, Eclipse workspace, ucm |
| CLEARCASE XPN not parsed as variable in clearcase command | cleartool man, *cleartool mkrtype, command line, extended pathname, text file* | linux | cleartool find |
| CCRC ClearCase Remote Client - Error 'Config spec for view... needs to be synchronized | ClearCase Remote Client (CCRC), *IBM Rational ClearCase Remote Client*, ucm, *vob, web view* | synchronize with stream, CCRC Version: 7.1.1 | |
| Unable to undo rebase stream | *integration view*, rebase operation, *recommended baseline, target view*, vob | | cleartool rebase |
| Web Service Auto Generated Files | *WSDL file*, ear, *roundtrip, web services, xsd* | SEL, ser, deser, helper files, BOUNTY EDIT | |
| What's the easiest way to detect "evil twins" in Rational ClearCase? | ClearCase MultiSite, *IBM Rational ClearCase, ccrc, clearfsimport*, file element | vob, ClearCase 7.1 | cleartool, cleartool find |
| How to rename member baseline? Is it acceptable practice? | new baseline, *project, pvob, rebase, rmbl* | cleartool rmname, UCM, clearcase | lbtype, label type |
| Cleartool command: Get symlink path and target | VOB symlink, *cleartool rmelem command. config spec, global path*, pathname | | |

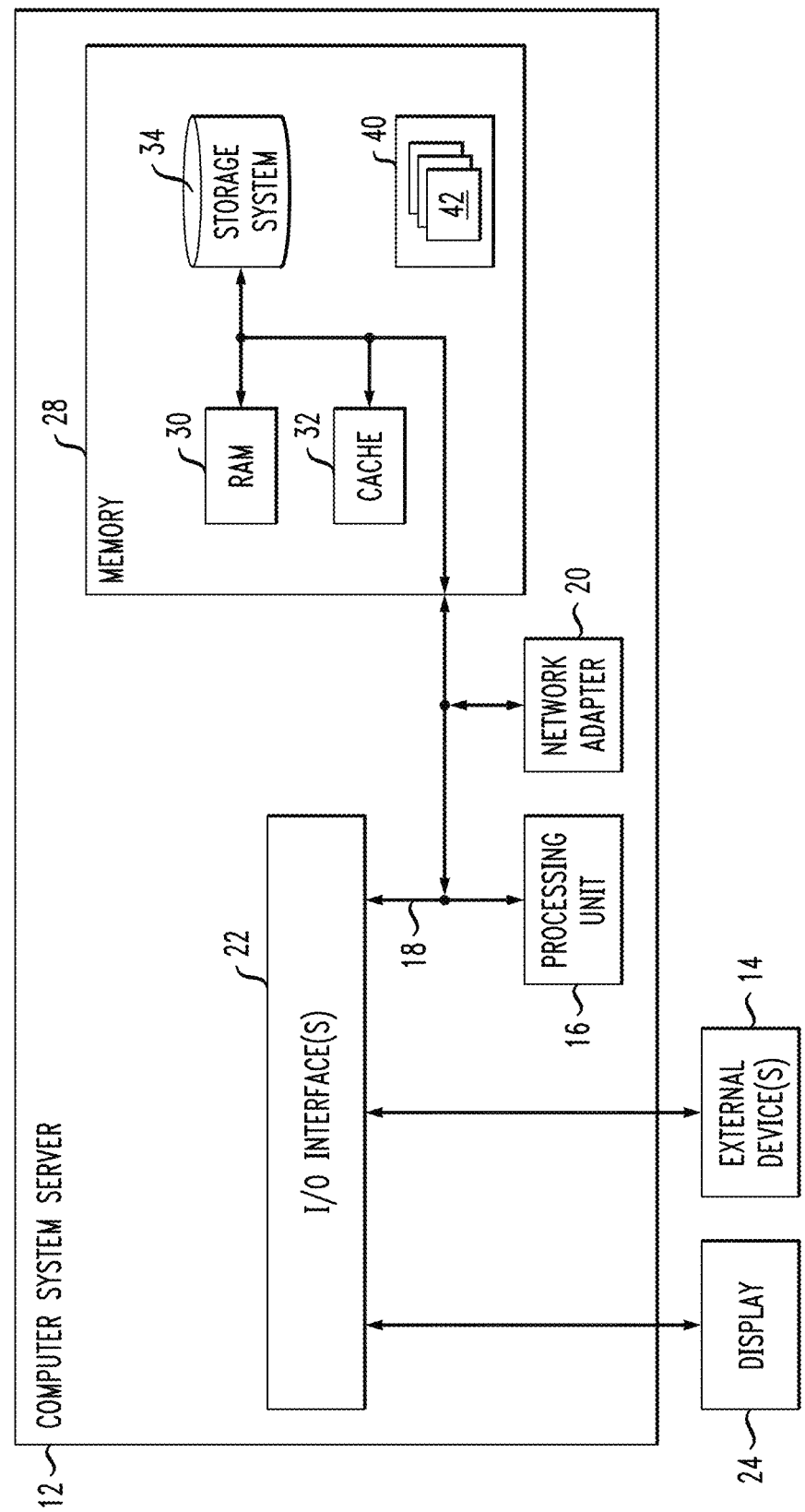

US 11,940,996 B2

UNSUPERVISED DISCRIMINATIVE FACET GENERATION FOR DYNAMIC FACETED SEARCH

BACKGROUND

The present invention relates to the electrical, electronic and computer arts, and more specifically, to machine learning and the like.

Human-computer information retrieval (HCIR) is the study of techniques that take advantage of human intelligence in the search process. Through a multi-step search process, HCIR facilitates opportunities for human feedback by taking into account the query context. Examples of HCIR approaches include faceted search, relevance feedback, automatic query reformulation, illustration by tag clouds, and the like.

Facets are used to organize knowledge (e.g., documents) into a systematic order. Dynamic faceted search (DFS), an interactive query refinement technique, is an HCIR approach. It allows a user to narrow down search results through (dynamic) facets for which the mapping of documents is not known at indexing time and can only be determined at the time when the query is submitted.

SUMMARY

Principles of the invention provide techniques for unsupervised discriminative facet generation for dynamic faceted search.

In one aspect, an exemplary method includes, with a computerized search engine, retrieving a plurality of electronic documents relevant to a query; obtaining, via computerized term embedding, from the retrieved documents, a plurality of most similar terms with respect to the query; for each of the most similar terms, determining a pervasiveness score and a relevance score; filtering out, from the most similar terms, those of the terms that are pervasive, based on the pervasiveness score, those of the terms that are irrelevant, based on the relevance score, and those of the terms that are redundant; and outputting a top number of terms remaining in the most similar terms after the filtering, based on similarity to the query, as discriminative facets.

In another aspect, an exemplary apparatus includes a memory; a non-transitory computer readable medium including computer executable instructions; and at least one processor, coupled to the memory and the non-transitory computer readable medium, and operative to execute the instructions to: obtain a plurality of electronic documents relevant to a query (e.g. from an external search engine); obtain, via computerized term embedding, from the retrieved documents, a plurality of most similar terms with respect to the query; for each of the most similar terms, determine a pervasiveness score and a relevance score; filter out, from the most similar terms, those of the terms that are pervasive, based on the pervasiveness score, those of the terms that are irrelevant, based on the relevance score, and those of the terms that are redundant; and output a top number of terms remaining in the most similar terms after the filtering, based on similarity to the query, as discriminative facets.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments provide improvement in the technological process of computerized document retrieval by reducing the virtual memory usage needed and the search space to find relevant documents and/or by returning more relevant documents than prior-art techniques.

These and other features and advantages of the present invention will become apparent from the following detailed description of illustrative embodiments thereof, which is to be read in connection with the accompanying drawings.

BRIEF DESCRIPTION OF THE DRAWINGS

FIGS. 3 and 4 depict construction of a greedy document term matrix, according to aspects of the invention;

FIG. 10 shows exemplary pseudo-code for an optimistic facet set selection approach, according to an aspect of the invention;

FIGS. 12 and 13 show exemplary experimental results, according to an aspect of the invention;

FIG. 15 depicts a computer system that may be useful in implementing one or more aspects and/or elements of the

DETAILED DESCRIPTION

Figure 1:
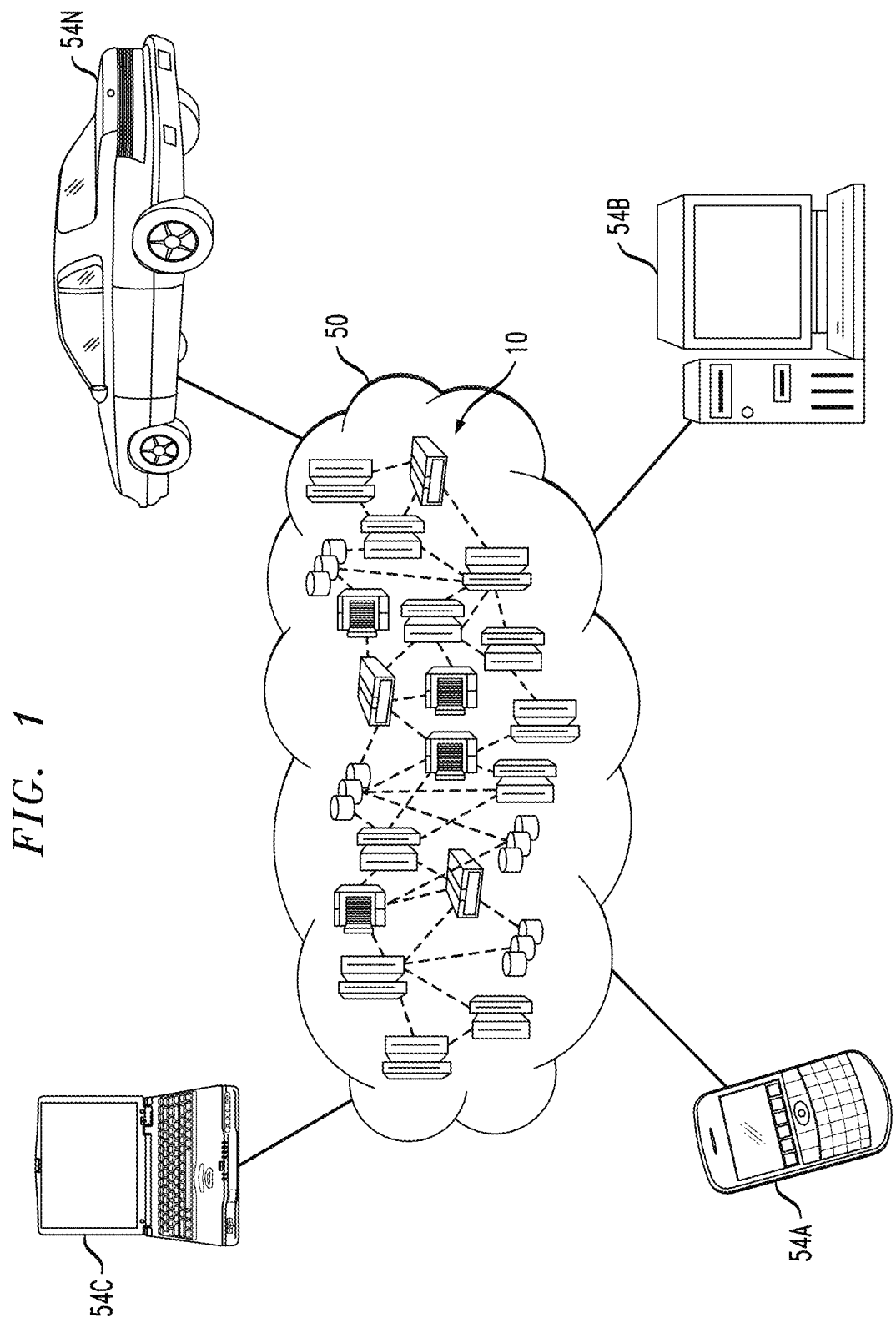
FIG. 1 depicts a cloud computing environment according to an embodiment of the present invention.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
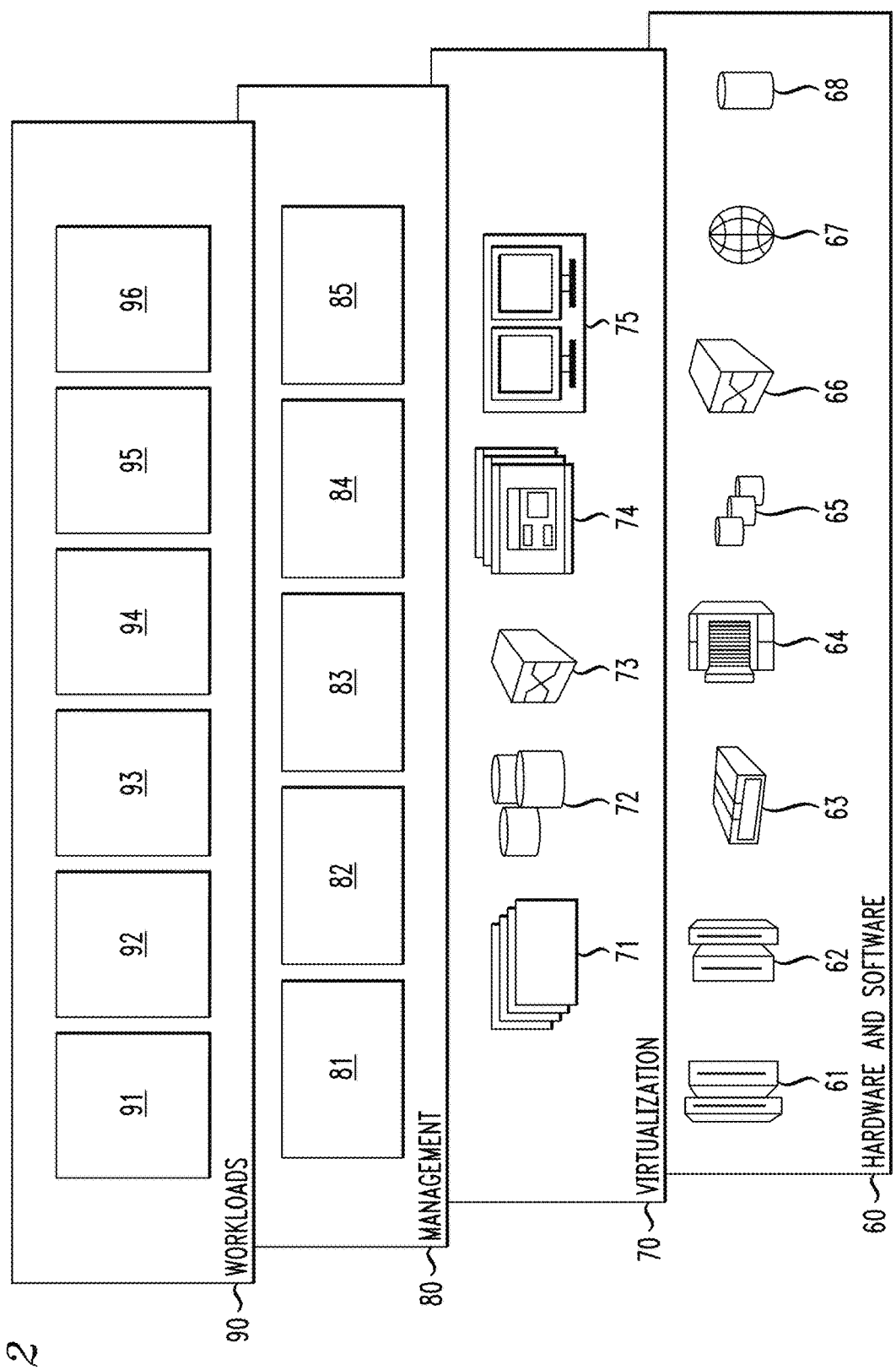
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a cloud-based service 96 (or one or more elements thereof) to provide unsupervised discriminative facet generation for dynamic faceted search.

Aspects of the invention provide techniques for unsupervised discriminative facet generation for dynamic faceted search. Facets relate to the organization of knowledge (e.g., documents) into a systematic order. With the enormous amount of unstructured data available in documents, it is important for customers to rapidly narrow down the search over a large corpus in a structured manner and find relevant information quickly. Faceted search involves augmenting a document retrieval system with a faceted navigation system to allow users to narrow down search results by filtering based on a faceted structure.

Current approaches for facet generation include manual and automatic techniques. Manual techniques involve adding facets to documents manually, e.g., as "annotations/tags" prior to document indexing. Automatic techniques select facets based on the query. Automatic techniques can be further divided into static and dynamic approaches. In the static approach, selection is made from a pre-defined list of terms or taxonomy. In the dynamic approach, facet generation is conducted on-the-fly from terms appearing in relevant search results. The dynamic approach typically uses topic model, type model, knowledge graph, and the like to identify and rank dynamic facets given a query.

Existing dynamic facet generation approaches select facets based on their topic and/or type similarity with respect to the query. However, there are only a limited number of facets (3-10) that a user will realistically check. Currently, there is no room for showing a large number of facets no matter how related they are with respect to the query. Limitations of existing dynamic facet generation include inability to detect redundant facets, inability to detect useless facets, and inability to detect non-discriminative facets. Examples of redundant facets include when two facets X and Y appear in the same set of documents in the search results, or when the user already selected a facet (e.g., "ACMEphone X") which is co-hyponym of another facet to be shown (e.g., "ACMEphone 6"). An example of a useless facet includes "ibm" for a document collection about IBM. An example of a non-discriminative facet would be a facet term X that appears in 90% of the search results; it is not discriminative enough. Thus, existing dynamic facets are not necessarily organizing documents to enable rapidly narrowing down search.

Advantageously, one or more embodiments consider constraints of a product team, e.g., no additional resources required, faster runtime, etc. One or more embodiments are based on a hypothesis of relevancy:

If a facet X appears in almost all documents (regardless how high similarity it has with the query), it is useless.

If a facet X almost always appears in the same documents with another facet Y, then either X or Y is redundant.

Taking into consideration the limitations of the existing dynamic facet generation techniques, one or more embodiments show the user a set of a limited number of highly relevant discriminative facets that indirectly put structure in documents in search results. Thus, one or more embodiments provide a technique for automatically generating a set of N discriminative facets given a query. Steps include retrieving search results (henceforth, documents) relevant to the query using a search engine; obtaining M most similar terms (with respect to the query) from the documents using term embedding, where M>>N; calculating proposed pervasiveness scores and relevancy scores for the each of the M candidate terms given the documents and the query; and exploiting a comprehensive document-term matrix to calculate the above-mentioned scores and redundancy. Further steps include filtering candidate terms based on pervasiveness; filtering candidate terms based on relevancy; filtering candidate terms based on proposed greedy assumptions of redundancy; filtering candidate terms based on contextual redundancy; and outputting the top N terms from the remaining terms based on their similarity with the query.

One or more embodiments work across a corpus, employ an input taxonomy of instances and types, add expanded terminology to the facets, rank and/or filter categories, and/or generate an embedding of the taxonomy instances.

One or more embodiments make greedy assumptions of redundancy, allowing one or more embodiments to be more precise (as compared to the prior art) without needing a large search space ("large" in this context is with respect to the search space of a combinatorial search; one or more embodiments need not consider all possible combinations of facets, but instead use a greedy search: adding the best single facet to the set of facets at each step). One or more embodiments assume that the semantic similarity score of a generic term with respect to a given query will be higher than that of a more specific term that contains the tokens of the generic term (e.g., "audio," "laptop audio"). Furthermore, one or more embodiments assume that if a term X is not pervasive in the search results (i.e., documents) of a query, and has been previously selected as a facet by the user, then it is redundant to select any term Y as the next facet where at least one non-functional token(s) of X appears in Y. For example, X could be a generic term of Y, e.g., "APEX products" and "APEX phones," OR X and Y are co-hyponyms with respect to the user query, e.g., "ACMEphone X" and "ACMEphone 11," OR X and Y are related, e.g., "ACMEphone marketing" and "ACMEphone production," but because they have common token(s), they likely share similar documents. Ignoring Y will likely result in smaller false negative rate.

Consider a comprehensive document-term matrix. When noun phrases are extracted from a document, they are usually extracted as a largest possible semantic unit. For example, "ACME University" is extracted instead of "ACME" and "University." This is because compositional semantics sometimes cannot form the meaning of noun phrases from individual lexical semantics of corresponding words. Accordingly, referring to FIG. 3, a document-term matrix (here, for the exemplary query "self driving cars") is usually incomplete, when using prior art methods.

The skilled artisan will be familiar with the seminal paper about unsupervised word sense disambiguation by David Yarowsky, Unsupervised word sense disambiguation rivaling supervised methods, In 33rd annual meeting of the association for computational linguistics 1995 June (pp. 189-196). Yarowsky laid out the following properties:

One sense per collocation: two nearby words provide strong and consistent clues to the sense of a "target word."

One sense per discourse: the sense of a "target word" is highly consistent within any given document.

We have found a useful hypothesis in documents retrieved using keyword-based information retrieval (IR); namely, compositional semantics will hold when a very related term (with respect to the query) is a super term of another very related term. This hypothesis works in practice because of the kind of scoring functions (e.g., BM25 (Okapi BM25 (BM is an abbreviation of best matching) is a ranking function used by search engines to estimate the relevance of documents to a given search query)) that reward documents where tokens in a search query appear in close proximity. In the example of FIG. 3, "vehicles," "autonomous_vehicles," and "driving_vehicles" are very related terms in the context of a search query "self-driving cars." Furthermore, linguistically and compositionally, "autonomous_vehicles" and "driving_vehicles" are super terms for "vehicles" (base term). Recognizing these facts leads to the comprehensive document-term matrix of FIG. 4, in the context of the aforementioned search query. In other words, every document where the term "autonomous_vehicles" or "driving_vehicles" is seen should be considered a document for the term "vehicles" as well for the above search example. For the next example, assume that there is a country called "ACME" and also a university called "ACME University" that is located in the United States and not in the country called "ACME." If the search query is "universities in ACME" (seeking information about universities in the country "ACME"), it is very unlikely that the term "ACME University" (of the United States) will appear in the documents ranked as top search results. As a result, even though the term "ACME University" is linguistically (but not compositionally) a super term of the term "ACME," it will be safely ignored when the comprehensive document-term matrix for "ACME" will be constructed from its corresponding super terms in the search results.

Pertinent notation will now be introduced:

query_text=the given user query similarity( )=A function to calculate semantic similarity between two texts; e.g., Word2vec (w2v) similarity, Latent Semantic Analysis (LSA) similarity, Latent Dirichlet Allocation (LDA) similarity, and the like.

Set D=List of top N documents returned by the search engine with respect to the given user query TDocs=Greedy document-term matrix containing Doc-IDs (document identifiers) in documents in set D mapped to top X related terms (with respect to the query vector) in those documents T_sim_score=List of pairs (term, sim_score), where term $\in$T and sim_score=similarity(query, term)

Set Prev_Sel_Facets=List of previously selected (by user) facet terms, if there any MX=Maximum number of facets to be generated One or more embodiments make use of a "Doc Pervasive Score." The "Doc Pervasive Score" or "DPS" of term X is the probability of X appearing in the related documents of X inside the search results of the query:

Let TDocs_Rel_X={D$\in$TDocs where similarity(D,X)> Threshold}. If it is considered that all documents in search results are related, then TDocs_Rel_X=TDocs Let Tdocs_Rel_X_found={D$\in$TDocs_Rel_X where X is seen inside D}

$$DPS=|Tdocs\_Rel\_X\_found|/|Tdocs\_Rel\_X|$$

One or more embodiments make use of a "Doc Relevance Score." The "Doc Relevance Score" or "DRS" for term X will indicate how relevant a term is with respect to each individual document in the search results of the query strictly considering the ranking of the documents (popularity of the term in context):

Let TDocs_X_found={D$\in$TDocs where X is seen inside D}

DRS=sum([1/r for D in TDocs_X_found]), where "r" is the rank of D in the search results.

An exemplary method will now be discussed with respect to the flow chart of FIG. 14, which begins at 1501. One step 1503 includes taking as input the top X related terms (with respect to the query vector), as candidates, from the top N documents in the search results. Another step 1505 includes creating a super term retrieval index, utilizing Terminological Bucket Indexing (the skilled artisan will be familiar with same from, for example, An Efficient Approach for Super and Nested Term Indexing and Retrieval, Md Faisal Mahbub Chowdhury and Robert Farrell, arXiv:1905.09761v1 [cs.DS] 23 May 2019). Still another step 1507 includes creating the comprehensive document-term matrix, TDocs, considering documents only in the top N search results and using the super term index. Yet another step 1509 includes filtering those candidate terms which have at least one non-functional token that already seen either inside the query or in one of the terms in Prev_Sel_Facets. A further step 1511 includes calculating the DPS and DRS scores for each remaining candidate term.

A still further step 1513 includes filtering any remaining term with DPS<threshold_th; the value of "threshold_th" can be either set through parameter tuning experiments or hard-coded based on prior experience of a person having ordinary skill in the art (purely by way of a non-limiting example, a value of 0.7 can be used in some cases). An even further step 1515 includes filtering any remaining candidate term t, if there exists any other candidate term t' where t and t' are almost equally similar to the query (e.g., similarity score difference of less than 0.01) AND have non-functional token overlaps AND DRS_for_t<DRS_for_t'.

Figure 14:
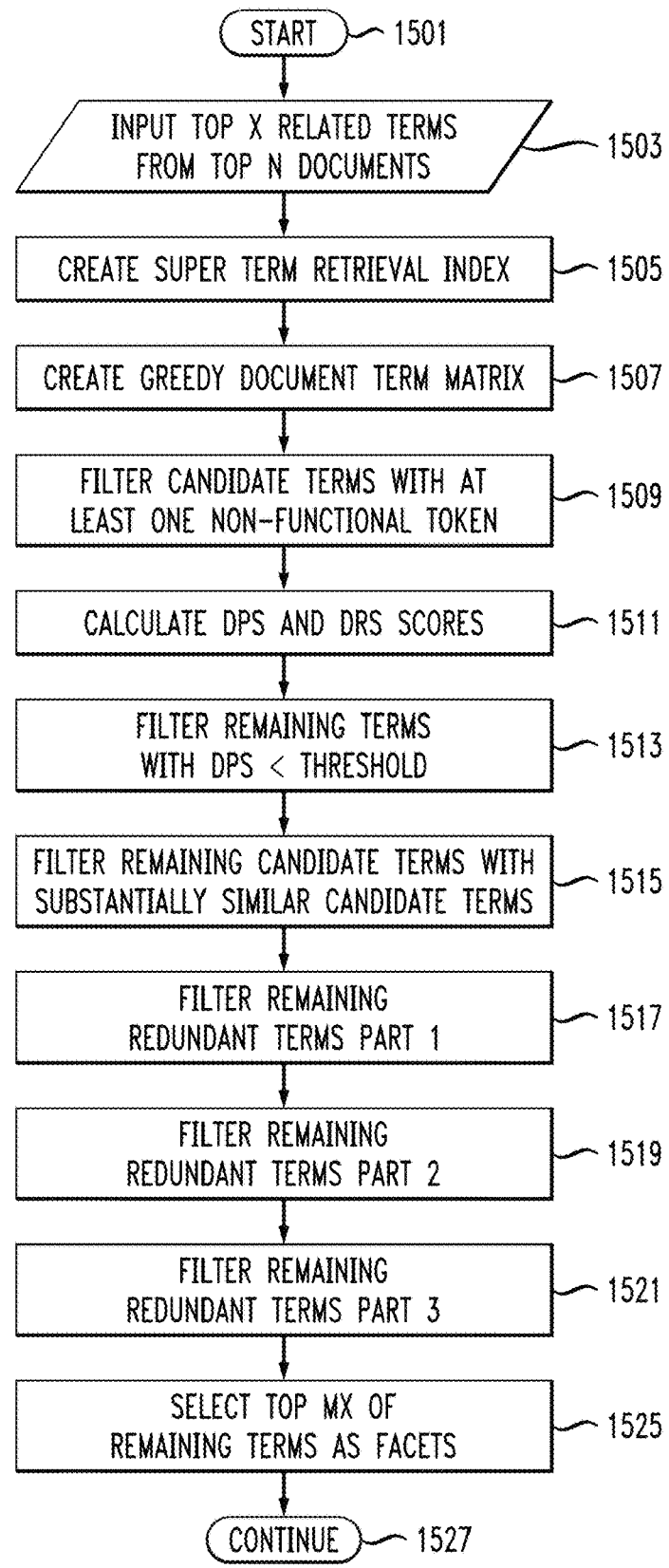
FIG. 14 is a flow chart of an exemplary method for an unsupervised discriminative facet generation for dynamic faceted search approach, according to an aspect of the invention.

Steps 1517, 1519, and 1521 all relate to filtering redundant terms; to avoid clutter, they are respectively referred to in FIG. 14 as FILTER REMAINING REDUNDANT TERMS PART 1, FILTER REMAINING REDUNDANT TERMS PART 2, and FILTER REMAINING REDUN- DANT TERMS PART 3. Step 1517 includes filtering any remaining term t as being redundant if there exists another candidate term x where x is a super term of t AND $T\_sim\_score[t] \leq T\_sim\_score[x]$. Step 1519 includes filtering any remaining term t as being redundant if there exists another candidate term y and z where $TDocs[t] \subseteq TDocs[y] \cup TDocs[z]$ AND $T\_sim\_score[t] \leq T\_sim\_score[y]$ AND $T\_sim\_score[t] \leq T\_sim\_score[z]$.

Step 1521 includes filtering any remaining term t as being redundant for y, z ∈ Prev_Sel_Facets where $TDocs[t] \subseteq TDocs[y] \cup TDocs[z]$ AND $T\_sim\_score[t] \leq T\_sim\_score[y]$ AND $T\_sim\_score[t] \leq T\_sim\_score[z]$. One or more embodiments still further include step 1525, selecting the top (MX=Maximum number of facets to be generated) of the remaining terms as facets. Processing continues at block 1527.

Figure 5:
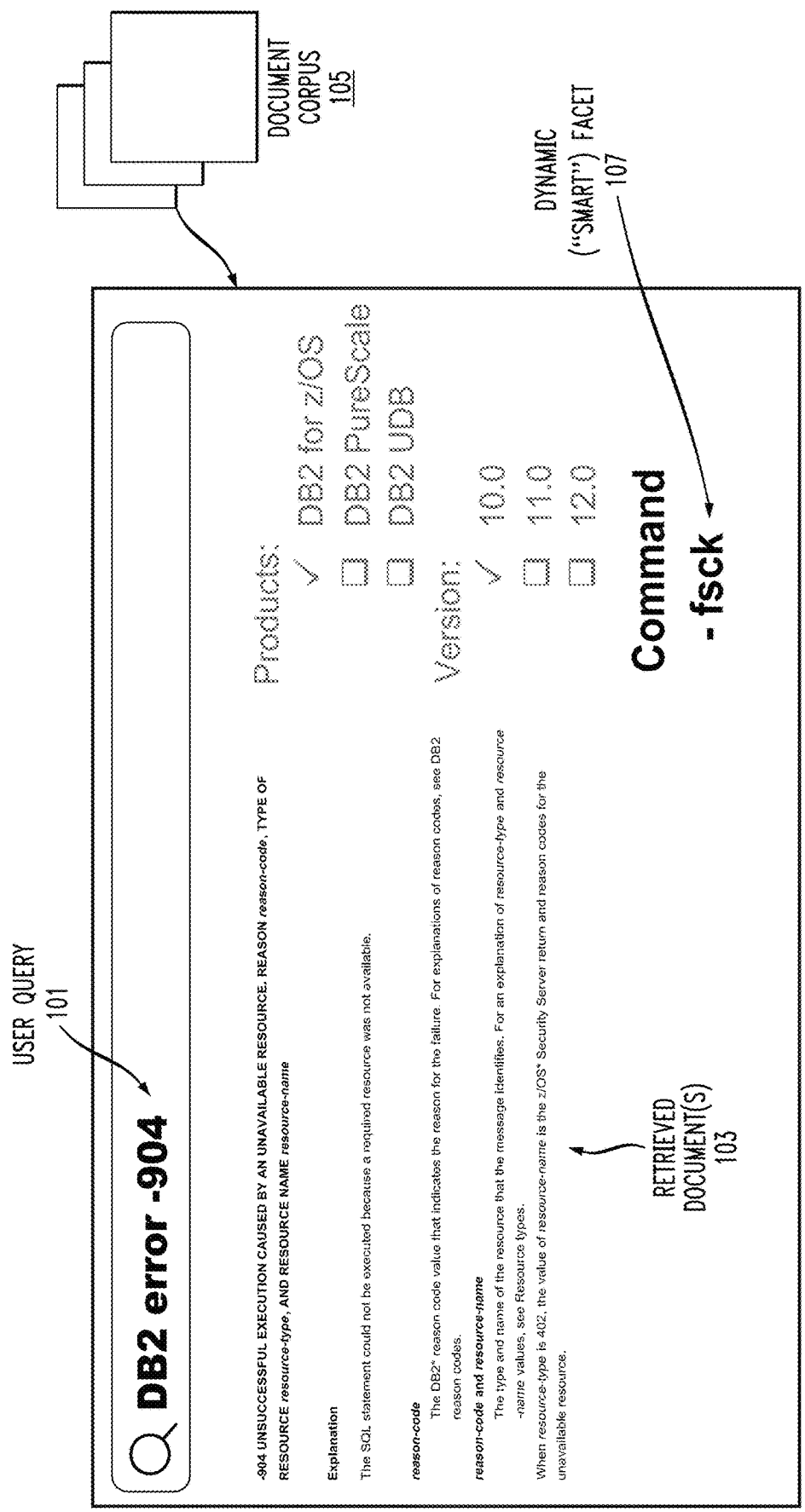
FIG. 5 shows dynamic faceted search, according to an aspect of the invention.

Aspects of the invention provide techniques for optimistic facet set selection for dynamic faceted search. Referring to FIG. 5, consider dynamic faceted search. The input 101 includes a user query (e.g., of a document corpus 105) with a set of result (retrieved) documents 103. The output includes a small set of terms that the user can select to refine or elaborate the query. For example, the dynamic or "smart" facet 107, if selected, will be added to the user query.

It is worth noting, as an aside, that one or more embodiments do not require grouping facets by category, although additional work can optionally be done (e.g., by simply checking in an ontology) to group the facets.

Figure 6:
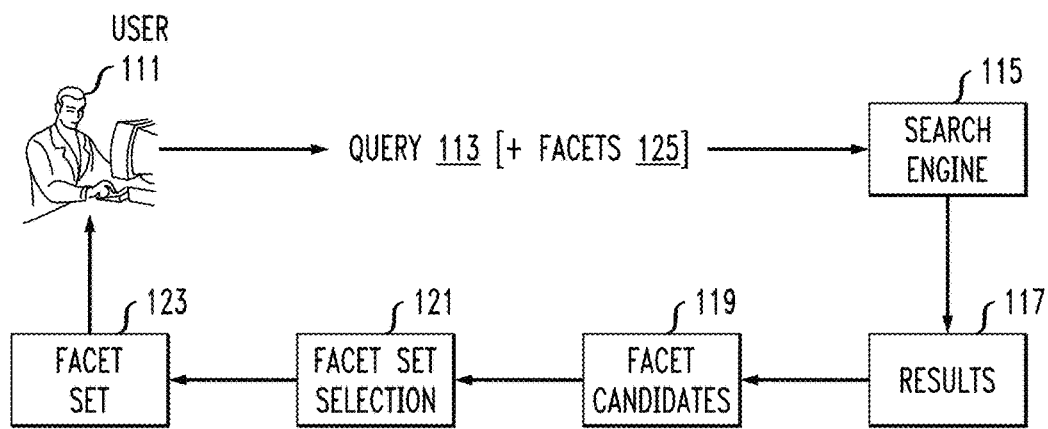
FIG. 6 shows facet set selection for dynamic faceted search, according to an aspect of the invention.

Referring to FIG. 6, consider now aspects of facet set selection for dynamic faceted search. User 111 sends a query 113 to search engine 115, yielding results 117. Facet candidates 119 are extracted from the results, and selection of a set of facets 123 is carried out at 121, based on the candidates. User 111 selects one or more and repeats the query, this time adding selected facets 125. The input thus includes (i) a set of facet candidates 119, and (ii) for each facet candidate, the ranking it will give to the result documents 117. The output is a set of facets 123 maximizing the chances of a good ranking, assuming the user 111 selects the best facet(s) 125.

One or more embodiments thus provide techniques to select from dynamically generated facets to improve search results. Current approaches for facet generation in connection with searching include:

Manual: this aspect includes adding facets to documents manually, e.g., as "annotations/tags" prior to document indexing.

Unsupervised: this aspect includes techniques to generate facets dynamically from queries, and further includes both generation and ranking aspects. Generation includes dynamic facet generation based on the current query context. This approach uses concepts of topic model, type model, knowledge graph, and the like to identify and rank dynamic facets given a query. The facet ranking process in such dynamic facet generation systems is also unsupervised; e.g., topic similarity-based for flat facets.

Facet generation in connection with searching can be helpful, for example, in customer care scenarios. Users often search for solutions to their problems with products, but may need assistance refining their queries to obtain the relevant documents.

In one or more embodiments, given facet candidates for enhancing a search, select a subset of facets to show to the user by maximizing the expected quality of the ranking, assuming the user can select the best facet. One or more embodiments provide a model of facet set selection that presents a diverse set of facets to the user. The facets are selected to offer the user options likely to promote the correct document. One or more embodiments provide a method for automatically generating a set of N optimistic facets given a query (e.g. forum title) and a query body (e.g. forum post), including steps of retrieving search results (henceforth, documents) relevant to the query using a search engine; obtaining M candidate terms from the documents using term embedding similarity (with respect to the query), or by using a different ranking, where M>>N; and calculating the probability that each document from the initial retrieval is relevant. Regarding M>>N, N typically depends on the designer of the app and also the user; i.e., it depends on how much patience the user has to go through facets. N could, in theory, range from a single digit number (such as 5) up to 100. As a rule of thumb, while not intended to be limiting, we have found that N is appropriately a single digit number. However, it could be 50 or 60 in some cases. If M is too high, it will take too much processing time. As a rule of thumb, while not intended to be limiting, we have found that M should be from twice to ten times N, and that M should also be at least 100 more than N; the larger value of M obtained from these two criteria should be picked. For example, if N=9, M=18 to 90 by first rule, so second criterion applies and M=at least 109.

Further steps include simulating the changes in the document ranking and document scores (e.g., BM25 (Okapi BM25 (BM is an abbreviation of best matching) is a ranking function used by search engines to estimate the relevance of documents to a given search query)) by selecting each facet candidate one at a time, and using that information to calculate expected DCG (discounted cumulative gain); and using the expected DCG to select a cluster of N optimistic facet candidates. In one or more embodiments, rather than ranking the candidates and taking the top N, optimize the set to be diverse. An even further step includes using the IDF-weighted (IDF=inverse document frequency) overlap with the query body for the evaluation of the facets.

One or more embodiments work across a corpus, use an input taxonomy of instances and types, add expanded terminology to the facets, rank and/or filter categories, generate an embedding of the taxonomy instances, and/or generate dynamic facets for search. One or more embodiments rank dynamically generated facets from search queries and results.

One or more embodiments assume that there is an initial set of results. One or more embodiments approximate the probability that each result is correct by its rank in the initial retrieval. In one or more embodiments, there is an initial ranking of the search results from the initial user query. When the user selects a facet, there is a new ranking of the search results because the facet appears in some results but not others. Optimistically, one or more embodiments assume that the user will select the facet that gives the best ranking (by DCG). Since it is assumed that the user can select the correct facet, it is desired to obtain a set of facets that can bring many search results near the top depending on which facet is selected. Formally, it is desired to achieve high expected DCG after the best facet (or no facet) is selected.

Figure 7:
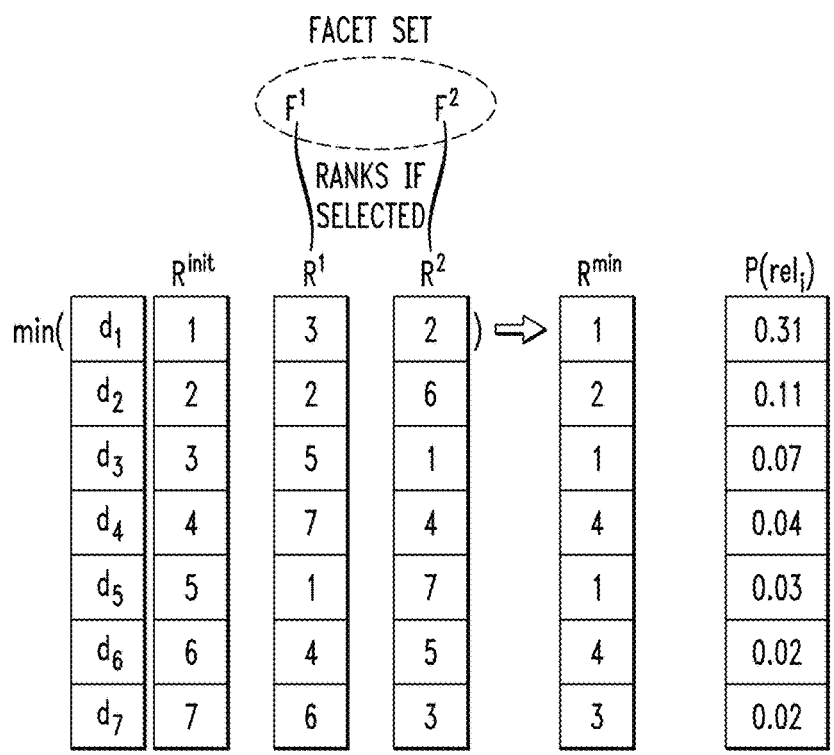
FIG. 7 shows aspects of optimistic facet set selection for dynamic faceted search, according to an aspect of the invention.

Referring to FIG. 7 and the pseudo code of FIG. 10, in one or more embodiments, the input includes a list of candidate facets L (also referred to as C) generated from the n top documents returned from the search (left-hand column of FIG. 10). Assume that selecting a facet and adding it to the query will result in a different rank; for example, if the facet occurs in a subset of the documents. In a first phase (middle column of FIG. 10), carry out greedy facet selection. Let F be initially an empty set of facets. For i from 1 to N (the expected number of facets) (expressed in FIG. 10 as a for/end for construct for i←1 through k), for each facet f in L (also referred to as C), estimate the expected DGC using equation 131. Select the f with the maximum expected DCG in F.

In a second phase, carry out a first variation (also referred to herein as local search, right-hand column of FIG. 10). For each new facet j in L (also referred to as C) not in F, swap j with every other facet f in F and measure improved DCG (expressed as the for/end for construct in the rightmost column of FIG. 10), and replace those facets with the max DGC gain from the swap. Repeat this process until the expected DGS no longer improves ($s^*=s_0$).

Furthermore in this regard, one or more embodiments employ the "First variation" because a set is being optimized. It is not feasible to examine all possible sets, so one or more embodiments employ a "greedy local" approach—greedily form a set by adding the best facet at each stage and also see if swapping is appropriate. Known techniques can be employed for optimizing over a set. It is pertinent to note that one or more embodiments search over possible facet sets, and add those facets to a set that will increase the expected DCG the most, and then examine a "one-way" swap. Once all the one-way swaps have been considered, the limit of local search has been reached.

Figures 8, 9:
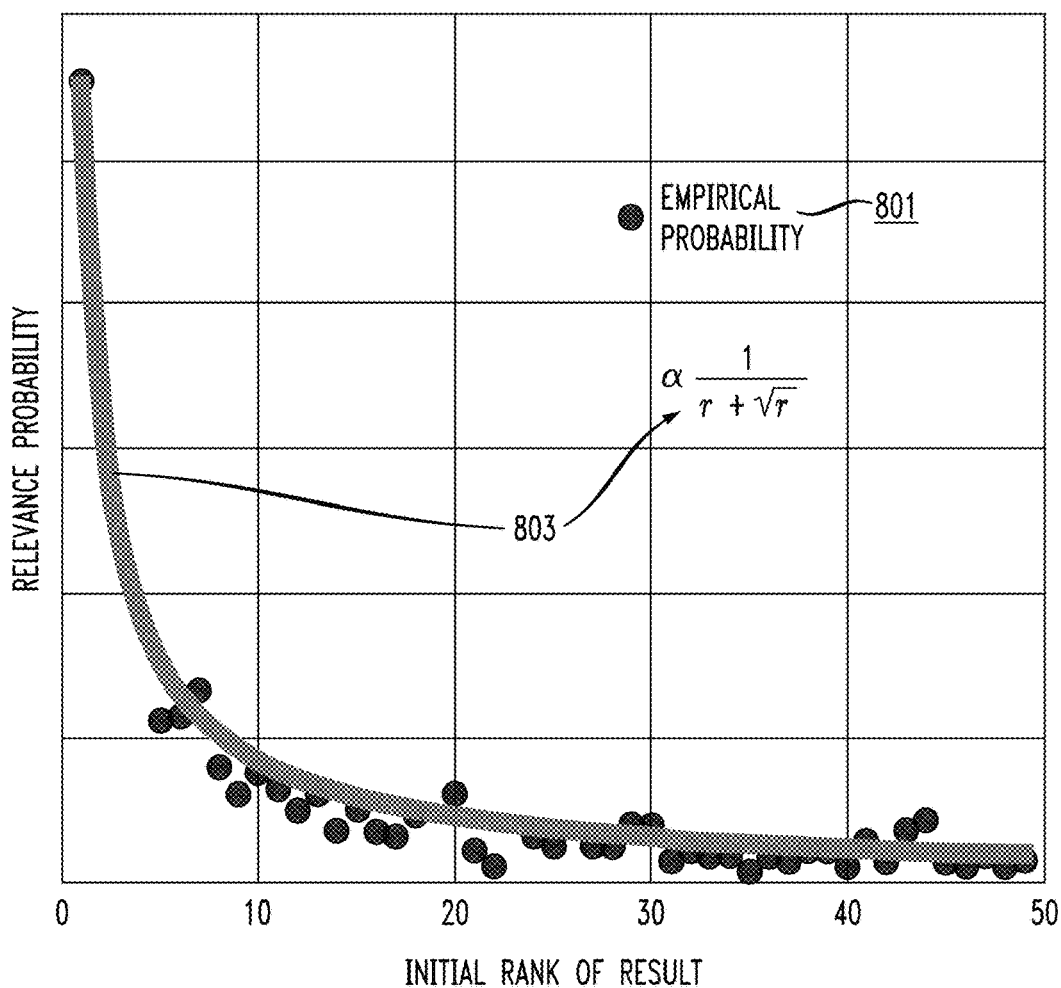
FIG. 8 is a graph of probability of relevance for a result with initial rank of i, according to an aspect of the invention.
FIG. 9 shows results of an experimental evaluation, according to an aspect of the invention.

Referring to FIG. 7, consider now the definition of $R^{min}$. For every facet $F^1$, $F^2$, there is some initial ranking of the documents. Each facet selected will give the document some new ranking. $R^{min}$ is the minimum across that row for the facets in the facet set. In each row, $R^{min}$ is the lower value among $R^{init}$, $R^1$, and $R^2$. The facet set includes $F^1$, $F^2$, and so on. $R^1$ is the ranking if $F^1$ is selected, $R^2$ is the ranking if $F^2$ is selected, etc. The right-hand column in FIG. 7 shows the probability of relevance for a result with an initial rank of i. In FIG. 8, the dots are empirical results as indicated at 801, while as indicated at 803, the line is a curve fit proportional to 1/(rank+square root of rank). Equation 131 at the bottom of FIG. 7 presents E(DCG) related to the probability of relevance and $R^{min}$. It can be used to compute E(DCG) for a facet set. Referring to the pseudo code of FIG. 10, the first procedure BEST computes E(DCG). BEST is a procedure called by both GREEDY (middle column) and LOCAL SEARCH (right-hand column). One or more embodiments carry out GREEDY first and then LOCAL SEARCH. LOCAL SEARCH is also referred to herein as the "first variation."

FIG. 9 shows non-limiting exemplary results from an empirical evaluation (MRR=mean reciprocal rank).

As noted above, dynamic faceted search (DFS), an interactive query refinement technique, is a human-computer information retrieval (HCIR) approach. It allows a user to narrow down search results through (dynamic) facets for which the mapping of documents is not known at indexing time and can only be determined at the time when the query is submitted. Disclosed herein are two new unsupervised approaches for dynamic facet generation, namely optimistic facets and discriminative facets. The first approach attempts to generate the best possible subset of facets by maximizing expected Discounted Cumulative Gain (DCG). The second approach generates a subset of ranked facets that appear to be discriminative with respect to each other by exploiting some heuristics and document relevance. Also disclosed is an exemplary methodology to automatically evaluate such techniques through simulation, and release codes to generate a new evaluation dataset. Through empirical experimental results on two datasets, it can be seen that DFS approaches according to aspects of the invention are capable of considerably improving the ranking of the relevant documents in the search results when compared to approaches not using DFS. Furthermore, we have found that facets that maximize the graded relevance perform significantly better than the facets that are intended to minimize redundancy.

As also noted above, human-computer information retrieval (HCIR) is the study of techniques that takes advantage of human intelligence in the search process. Through a multi-step search process, HCIR facilitates opportunities for human feedback by taking into account the query context. Examples of HCIR approaches include faceted search, relevance feedback, automatic query reformulation, illustration by tag clouds, and the like.

Facets are used to organize knowledge (e.g., documents) into a systematic order. With the enormous amount of unstructured textual data available, one or more embodiments advantageously provide techniques for users to rapidly narrow down the search over a large corpus in a structured manner and find relevant information quickly.

Faceted Search (FS) is a prevalent technique for interactive information retrieval, e.g., in e-commerce. It involves augmenting a document retrieval system with faceted navigation to allow users to narrow down search results by filtering (i.e., refining user queries) based on relevant facet selection.

Facets (independent of each other) provide guidance to the user by presenting an overview on the variety of data available given the user query, thereby hinting at the refinement operations that seem most promising for zooming in on the target information need. Users often find it challenging to formulate a complete query for search. Traditional facet generation approaches present several drawbacks. Documents must be tagged with an existing taxonomy, adding overhead in content curation and management. Moreover, such static facets are not based on the matching documents or queries. Dynamic Faceted Search (DFS) overcomes such limitations. Dynamic facets are those for which the mapping of documents is not known at indexing time and can only be determined at the time when the query is submitted.

DFS provides an interactive search experience to guide the user to form a more complete query. The facets are generated dynamically in real-time based on the search results specific to the query. This allows the user to interactively refine the user's query, and consequently the search results, by selecting relevant facet(s), if there is/are any.

As noted, disclosed herein are two new unsupervised approaches for DFS. One approach aims to identify a set of k optimistic facets (k is the maximum number of facets expected by the user). This set is called "optimistic" because it is constructed to maximize the ranking of the relevant document(s), assuming, that the user selects the best facet in the set. The optimistic facets are not ranked among themselves. Another approach focuses on generating a ranked list of k discriminative facets where the goal is to identify facets that are non-redundant with respect to each other and relevant to the user's query. In exemplary embodiments of both of the approaches, the input is a set of candidate terms extracted from the search results based on their semantic similarity with respect to the given query.

Also disclosed herein are exemplary techniques for automatic evaluation of faceted search and/or automatically simulating the evaluation.

One or more embodiments are employed with regard to DFS on unstructured textual data. One or more embodiments focus on generating dynamic facets that are terms (which are not restricted), not just aggregated values, for enabling search on unstructured textual documents. One or more embodiments do not use any external resource and/or employ queries that are natural language texts, not simply keywords. Furthermore in this regard, some approaches to dynamic faceted search use some structured data in addition to the text of the corpus; in contrast, one or more embodiments use only the text documents.

One or more embodiments provide techniques to dynamically generate a small set of (flat list of) facets that will not be burdened by the requirement of organizing such facets in hierarchies. In goal-driven domains such as information technology (IT) support, users are looking for highly precise and confident information in a few facets.

One or more embodiments advantageously avoid facets that are synonymous with, or abbreviations/expansions of, the user's query terms, e.g., when the user query has the term "hdd" in it and the facet list has "hard disk drive." One or more embodiments advantageously avoid facets that are irrelevant due to the relationship with a facet previously selected by the user. For example, if the user already selected "ACMEphone X" as a facet, it is perhaps meaningless to show a co-hyponym such as "ACMEphone 6" in the following iteration of search and query refinement. One or more embodiments further advantageously avoid showing useless facets, e.g., showing "laptop" for a document collection about technical support of a laptop. One or more embodiments even further advantageously avoid showing non-discriminative facets; e.g., if a facet term appears in 90% of the search results, it would not enable rapidly narrowing down the search.

Unsupervised Dynamic Facet Generation

Consider an exemplary approach on candidate term extraction for dynamic facets as well as exemplary DFS solutions. In one or more embodiments, these solutions exist in a common setting, with scored document results for the initial query, and generated facet candidates, with the facet set as output. An initial retrieval component returns a scored list of n document results $D=[(d_1, s_1), (d_2, s_2), \ldots, (d_n, s_n)]$ where $s_i \in R$, based only on the initial query, $q_0$. Generate a set of c candidate facets $C=\{f_1, f_2, \ldots, f_c\}$. The (final) facet set, $F \subset C$, includes k facets, where k is either set by the user or constrained by the GUI of the interactive search system.

Facet Candidates Extraction: Given a user query and the respective search results, extract the terms that are considered as facet candidates for both DFS approaches. These terms should have a frequency above a defined threshold $\theta_{freq}$. Assume it is desired to generate k dynamic facets. Using a pre-trained word embedding model (for the indexed document collection), cosine similarity, $sim(q_0, t)$, between the query and each term t is computed. Next, the terms are ranked by their similarity score. Up to the top c terms with a minimum similarity score of $\theta_{sim}$ are kept as facet candidates that are later provided as input to the exemplary embodiments. One or more embodiments set $\theta_{freq}=3$, $\theta_{sim}=0.5$, and $c=\max(k^2, 100)$.

Optimistic Facet Set Selection: In one or more embodiments, Optimistic Facet Set Selection is built on two pertinent assumptions:

Optimism: the user can select the best facet of those presented, where the best facet is the one that gives the best DCG (or other graded relevance measure).

Initial Retrieval Rank Probability: the probability that a document is relevant can be approximated by its rank in the initial search results.

In one or more embodiments, each candidate facet, f, is associated with some change in the scores of the document results, $\delta^f$, and therefore, some new ranking of the document results, $R^f$. Using the filter strategy, $\delta_i^f$ of is set as 1000 if f appears in document $d_i$ and zero otherwise. We also experimented with a strategy of computing the change in BM25 score if f is added to the query; however, this resulted in lower performance.

Suppose the probability that the $i^{th}$ ranked document from the initial retrieval is relevant is $p_i$. One or more embodiments fit a curve to estimate $p_i$ independent of the query or document results and find this probability to be roughly proportional to the inverse of the rank r plus the square root of the rank. FIG. 8 shows the empirical probability of relevance (dots 801) and the curve 803 to fit.

A facet set has a minimum possible rank for each document, the lowest rank that can be achieved by selecting any facet in the set, or no facet. This list of ranks is indicated as $R^{min}=[r_1, r_2, \ldots, r_n]$ where $r_j=\min(j, \min_{f \in F}(R^f))$. The list of ranks $R^{min}$ is closely connected with the optimistic assumption. Consider the case (a majority in the example) where only one document is relevant. Then, the expected DCG under the optimistic assumption is given by Equation 2. Discounted Cumulative Gain (DCG), given by Equation 1, is a standard metric in information retrieval to measure the overall quality of the search results. DCG depends only on the ranks of the relevant ($rel_i=1$) documents.

$$DCG = \sum_{i=1}^{n} \frac{rel_i}{\log_2(1+i)} \tag{1}$$

$$\mathbb{E}(DCG_F) = \sum_{i=1}^{n} \frac{p_i}{\log_2(1+R_i^{min})} \tag{2}$$

One or more embodiments select a facet set to approximately optimize $\mathbb{E}(DCG_F)$ using greedy and local search. Both the greedy and local search phases of facet set selection rely on a BEST function (see FIG. 10) to select the facet candidate that will improve the expected DCG of the facet set the most: Best(C, F, f*, s*). In the greedy phase of facet set selection, add k facet candidates to the facet set, each time adding the facet that improves the set's score the most. This is followed with a local search, where an aim is to swap each facet in the facet set for some better facet candidate. This process repeats until the expected DCG score does not improve. Algorithm 1 in FIG. 10 shows exemplary pseudocode for these functions.

Discriminative Facets Selection: This particular approach is based on a number of rules that are based on two hypotheses. It exploits two scores that are appropriate for any facet candidate term. Pervasive Score (PS) of a term t is the probability of t appearing in the related documents of t inside the search results of the query. Relevancy score (RS) for a term t is a measure of popularity of the term, computed using the ranks of the documents (where the term is seen) in the search results for the query.

$$PS(t) = \frac{|D_t^{found} \cap D_t^{rel}|}{|D_t^{rel}|} \tag{3}$$

$$RS(t) = \sum_{d_r \in D_t^{found}} \frac{1}{r} \tag{4}$$

Recall that the retrieved documents are $D=[(d_1, s_1), (d_2, s_2), \ldots, (d_n, s_n)]$. Find the set of documents that have a similarity to the term t greater than a threshold $\theta_{ps}$: $D_t^{rel}=\{d_r$ where $(d_r, s_r) \in D$ and $sim(d_r, t) > \theta_{ps}\}$. Also find the subset of documents where the candidate facet term t appears: $D_t^{found}$ $\{d_r,$ where $(d_r, s_r) \in D$ and $t \in d_r\}$. Here, r is the rank in the initial search results. Note, simplifying and considering that all documents in the search results are related, then $\theta_{ps}=0$ and PS becomes the probability of t appearing in the search results.

Hypothesis of relevancy: the following hypothesis of relevancy can be used for facets to be used for IR. If a facet t appears in almost all documents (regardless of how much similarity it has with the query), it is irrelevant because there is no information gain. If a facet t almost always appears in the same documents with another facet t', then either t or t' is redundant.

Hypothesis of redundancy: the following hypothesis of redundancy can be used for facets to be used for IR. The semantic similarity score of a generic term facet with respect to a given query will be higher than that of a more specific term facet that contains the tokens of the generic term (e.g., "ACMEphone," "ACMEphone 11"). If a term t is not pervasive in the search results (i.e. documents) of a query, and has been previously selected as a facet by the user, then it is redundant to select any term t' as the next facet where at least one non-stop-word token(s) of t appears in t' for either one of the following possibilities: (i) t could be a generic term of t', e.g. "APEX products" and "APEX phones"; (ii) t and t' are co-hyponyms with respect to the user query, e.g. "ACMEphone X" and "ACMEphone 11"; (iii) t and t' are related, e.g. "ACMEphone marketing" and "ACMEphone production," but because they have common token(s), they likely share similar documents.

Identifying discriminative facets: in one or more embodiments, the discriminative facets are selected by using a set of filter rules. From the facet candidates, the system filters any term with PS score lower than a certain threshold (0.7 is a non-limiting example; the value of the threshold can be either set through parameter tuning experiments or hard-coded based on prior experience of a person having ordinary skill in the art). Then, it filters any remaining candidate term t, if there exist(s) any other candidate term t' where t and t' are almost equally similar (cosine similarity score difference ≤0.01 is a non-limiting example) to the query, have non-stop-word token overlaps, and $RS(t) < RS(t')$. Following that, filter any remaining term t as being redundant if there exists another candidate term is where is is a super term of t and $sim(q_0, t) \leq sim(q_0, t^s)$, where $sim(q_0, t)$ is the similarity to the query computed in facet candidate generation (a super term means a longer term (e.g., "autonomous vehicles") that contains another smaller term (e.g., "vehicles")).

After the above steps, the system filters any remaining term t as being redundant if there exist two candidate terms $t_1'$ and $t_2'$ where: (i) $D_t^{found} \subseteq D_{t_1'}^{found} \cup D_{t_2'}^{found}$, (ii) $sim(q_0, t) \leq sim(q_0, t_1')$ and (iii) $sim(q_0, t) \leq sim(q_0, t_2')$. The top k terms from the remaining candidates are provided as output.

Automatic Evaluation Framework

Figure 11:
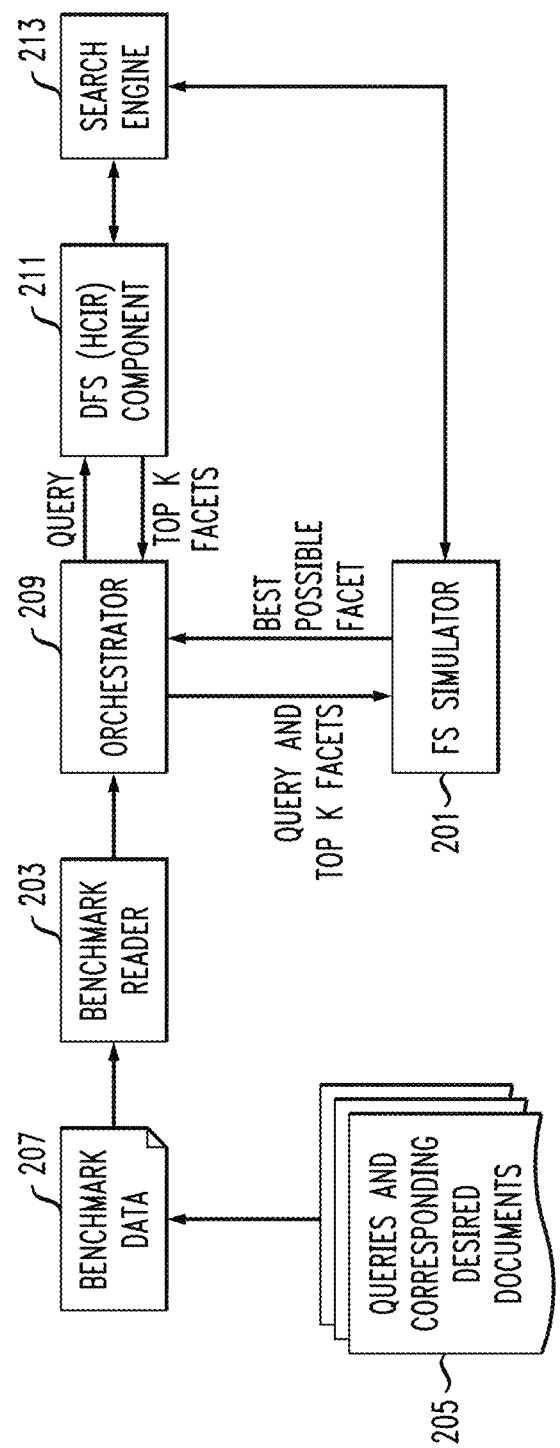
FIG. 11 shows an exemplary architecture, according to an aspect of the invention.

One or more embodiments provide an evaluation approach that selects the best facet for DFS on the indexed unstructured documents. The facet selection is simulated using an algorithm implemented by the facet selection simulator (FS simulator) 201 of FIG. 11. For each iteration of the faceted search, the system presents a list of ranked search results and facets to users. In a manual evaluation setting, a user selects a best search result, or selects a facet to trigger the next iteration of a search, if search results are non-satisfactory. In one or more embodiments, the FS simulator 201 simulates the user's behavior as follows (refer to FIG. 11). The benchmark reader 203 reads a user query 205 from the benchmark data 207 and sends same to the orchestrator 209. The orchestrator 209 sends the query to the DFS (HCIR) component 211. The DFS component 211 analyzes the search results, generates k facets (5 in a non-limiting example; the user can define an appropriate value based on how many facets are reasonable), and returns them back to the orchestrator 209. In a goal driven domain, a human user is typically looking for a few facets. The orchestrator 209 passes the query and the facets to the FS simulator 201.

Next, out of the k facets, the FS simulator 201 selects the best facet which retrieves the target document at the highest possible rank. Assume that an expert user is able to identify the best facet among the top-k facets presented (for the expert user's query), which leads to the target document. To select the best facet, the FS simulator 201 picks one facet out of the k facets at a time and passes them as a filter, along with the original query, to the underlying search engine 213. The returned results are checked to identify whether or not the selected facet improved the target document ranking.

If no facet is found to improve document ranking, then no facet is recommended by the FS simulator 201. The FS simulator passes the selected facet to the orchestrator 209, which in turn sends the query, along with selected facet(s), to the DFS component 211.

This is followed by repeating the steps of component 211 analyzing the results, the orchestrator passing the query and facets to the FS simulator, the FS simulator selecting the best facet, and the FS simulator passing the selected facet to the orchestrator, until a stop condition is met. In every iteration for a given query, whenever the next best facet is selected by the FS simulator, it is added to the list of previously selected facets, if there is/are any, as (a) filter(s). There are a number of suitable commercially available search engines that can be used to implement engine 213; e.g., a distributed, RESTful search and analytics engine.

Experimental Results

In our experiments, we indexed a suitable corpus. For a given query, we set the maximum number of results to be returned as 100. For any query, the FS simulator accepts only up to 5 facets from a DFS approach. There are two stop conditions. One is when no facets are returned by the DFS approach. The other is that the FS simulator can select up to a maximum of 3 facets (i.e., up to 3 iterations of Steps 1507, 1509, 1511, 1513 described with respect to FIG. 14) per query.

In order to evaluate the impact of exemplary embodiments of our approaches, we compared them against a strong baseline. We will refer to it as similarity based DFS. It selects the top k facets from the facet candidates, where none of these facets was already selected before and also did not appear in the query. The facet candidates come directly from the documents in the search results, and are ranked by semantic similarity with respect to the query.

Quantitative Evaluation: The purpose of this experimental evaluation was to sim (verify and report result improvement after the queries were augmented with the generated dynamic facets as search filters. Three standard evaluation metrics were used: Discounted Cumulative Gain (DCG), Mean Reciprocal Rank (MRR), and Hits@K (the count of queries for which a corresponding positive (i.e., desired) document is ranked in the top-K documents in the corresponding search results). For Hits@K, we share the absolute number of queries where the expected document(s) is ranked within top-K results.

The table of FIG. 12 shows the performance of different DFS approaches when the simulated user does not see the desired document (for the given query) at rank 1 position in the search results. In other words, for example, given that hits@1 on the second dataset for "no DFS" is 75, the headroom for improvement for any DFS approach to improve search results is 883−75=808, i.e., 92%.

Note, we found that on the second dataset, "no DFS" does not return the desired document in for 528 (i.e., 60%) queries in the top 100 results. The same statistics for the first dataset are 174 (i.e., 29%) queries. To put it differently, it seems it is significantly more difficult for a popular traditional search engine to return the desired document even in the top 100 results for the second dataset queries than for the first dataset queries, even though the underlying indexed corpus is the same. Exemplary datasets could include, for example, data relating to providing customers help with information technology (IT) problems, but this is non-limiting and one or more embodiments are domain-independent.

As evident from the results, optimistic DFS demonstrated a significant edge over the other two DFS approaches on both of the datasets in every single metric. Another pertinent point is that even though it was expected that removal of redundant facets, i.e., output of discriminative DFS, would lead to better results compared to similarity-based facets, the actual improvement was minimal. We observed in our experiments that while such discriminative facets provided a better grouping of the underlying search results, most of these are not necessarily coming from the desired documents.

Qualitative Evaluation: For the qualitative evaluation, we selected a sample set of random queries from the second dataset. A subject matter expert (SME) manually inspected the facets (produced by optimistic DFS) for the respective query and the question post to identify potential candidate facets for query refinement. According to the SME, a facet is considered useful, if it is contextually related but not already mentioned in the user's (short) query or in the target document.

The table in FIG. 13 shows a sample subset of "User Query," the corresponding "Top 5 Dynamically Generated Facets," "Additional Relevant Facets Present in Post" that the system could have considered to rank higher to place in the top 5, and "SME Recommended Facets" that the system should have presented (even though they are not seen in the post), as they are relevant for the user's query.

In the column Top 5 Dynamically Generated Facets, the SME used four evaluation criteria:
  (i) "Facets seen in Post" (highlighted by teletype font)—facets that are present in the post body and also generated by the exemplary algorithm e.g., 'ClearCase Remote Client (CCRC)';
  (ii) "Facets seen in Post and relevant for query" (highlighted by underline)—facets seen in the post body and also relevant for query e.g., ClearCase Remote Client;
  (iii) "Facets unseen in Post" (highlighted by italic font)—facets generated by the system but unseen in the post body e.g., 'Rational ClearCase SCM Adapter,' 'rad,' 'source control';
  (iv) "Facets unseen in Post but relevant for query" (highlighted by bold underline)—facets that the system generated but unseen in the post but are relevant for the query e.g., 'dynamic views.'

In summary, 22 randomly chosen queries and respective 5 facets (from Optimistic DFS) generated were evaluated by the SME. On average (per query), an exemplary system generated 67% "Facets unseen in Post," 22% "Facets unseen in Post but relevant for query," 2% "Facets seen in Post," and 9% "Facets seen in Post and relevant for query."

Thus, disclosed herein are two different unsupervised approaches for dynamic facet generation. Optimistic facet generation strives to find a set of possible facets which together maximize the graded relevance of the documents in the search results if the user chooses the best facet. In other words, there is no ranking among the selected subset of facets. Under optimistic assumptions, this subset is constructed to approximately optimize the DCG when a facet is selected.

Discriminative facet generation optimizes a ranked list of facets to minimize redundancy and non-relevancy between facets, with respect to every other facet already selected. This is pertinent for goal driven applications such as a virtual assistant for IT Support, as users are looking for concise, non-redundant and confident information. In this approach, there is no attempt to maximize the relevancy of the search results, but rather an attempt to minimize the non-relevancy among the facets. As it turns out from the empirical results, facet sets that maximize the graded relevance perform significantly better than the facets that are intended to minimize redundancy. Both set of facets, however, are capable of considerably improving the ranking of the relevant documents in the search results when compared to not using DFS at all.

Given the discussion thus far, it will be appreciated that, in general terms, an exemplary method, according to an aspect of the invention, includes, with a computerized search engine, retrieving a plurality of electronic documents relevant to a query. This can be done, for example, using known search engine software executing on a server such as server 12. A further step includes obtaining, via computerized term embedding, from the retrieved documents, a plurality of most similar terms, M, with respect to the query. The most similar terms can be obtained, for example, via term embedding wherein terms are mapped to vectors. Vector similarity measures such as cosine similarity, Euclidean distance, or inner product, or the like, can be employed. Cosine similarity is applied in one or more non-limiting exemplary embodiments. The skilled artisan can pick a suitable value of M based on the teachings herein or select same based on a parameter tuning step. This step can be carried out, for example, using server-side software on the same server that does the search, or on a server coupled thereto. The software can implement the logic disclosed herein.

A further step includes, for each of the most similar terms, determining a pervasiveness score and a relevance score. This step can be carried out, for example, using server-side software on the same server that does the search, or on a server coupled thereto. The software can implement the logic disclosed herein (e.g., equations (3) and (4)).

A still further step includes filtering out, from the most similar terms, those of the terms that are pervasive, based on the pervasiveness score, those of the terms that are irrelevant, based on the relevance score, and those of the terms that are redundant. This step can be carried out, for example, using server-side software on the same server that does the search, or on a server coupled thereto. The software can implement the logic disclosed herein.

Yet a further step includes outputting a top number of terms, N<<M, remaining in the most similar terms after the filtering, based on similarity to the query, as discriminative facets. This step can be carried out, for example, using server-side software on the same server that does the search, or on a server coupled thereto. The software can implement the logic disclosed herein. As discussed elsewhere herein, N typically depends on the designer of the app and also the user; i.e., it depends on how much patience the user has to go through facets. N could, in theory, range from a single digit number (such as 5) up to 100. As a rule of thumb, while not intended to be limiting, we have found that N is appropriately a single digit number. However, it could be 50 or 60 in some cases. If M is too high, it will take too much processing time. As a rule of thumb, while not intended to be limiting, we have found that M should be from twice to ten times N, and that M should also be at least 100 more than N; the larger value of M obtained from these two criteria should be picked. For example, if N=9, M=18 to 90 by first rule, so second criterion applies and M=at least 109.

In one or more embodiments, determining the pervasiveness score includes determining, for each of the most similar terms, a probability of a given one of the terms appearing in related documents of the term within the retrieved plurality of electronic documents.

Furthermore, in one or more embodiments, determining the relevancy score includes determining, for each of the most similar terms, a popularity of a given one of the terms computed using ranks of those of the documents wherein the given one of the terms appears, within the retrieved plurality of electronic documents.

In some instances, filtering out, from the most similar terms, those of the terms that are redundant, includes discarding a given one of the most similar terms responsive to determining that the given one of the most similar terms includes at least one non-functional token from a non-pervasive term previously selected as one of the facets (assuming that one or more facets have already been chosen).

In some cases, filtering out, from the most similar terms, those of the terms that are redundant, includes determining whether those of the documents corresponding to a current one of the terms are already covered by another one of the terms. In general, check whether a current facet is redundant because the corresponding documents are already covered by an existing facet; check redundancy based on joint terms such as "LED screen" and "OLED" where "LED Screen" might well cover all the documents turned up by OLED.

One or more embodiments further include, with the computerized search engine, retrieving an updated plurality of electronic documents relevant to the query by resubmitting the query with at least one of the discriminative facets. This has the practical application of improving the technological process of computerized information retrieval (a better answer since relevant documents will appear near the top of the list).

In one or more embodiments, in the step of outputting the top number of terms, the top number of terms does not exceed nine. Furthermore, in one or more embodiments, obtaining the plurality of most similar terms includes obtaining a number of the most similar terms as a maximum of: (i) exceeding the top number of terms by at least one hundred; and (ii) being from twice to ten times the top number of terms.

As discussed with respect to FIGS. 3 and 4, one or more embodiments further include, in the most similar terms, associating super terms with a corresponding base term to obtain a greedy document-term matrix, wherein the pervasiveness score and the relevance score are determined based on the greedy document-term matrix. See discussion elsewhere herein re associating super terms with a base term.

In another aspect, an exemplary system includes a memory (e.g., 30, discussed elsewhere); a non-transitory computer readable medium (e.g., 34, discussed elsewhere) including computer executable instructions; and at least one processor 16, coupled to the memory and the non-transitory computer readable medium, and operative to execute the instructions to be operative to perform any one, some, or all of the method steps described above. The instructions on the medium can also configure the processor to instantiate appropriate software components; for example, a computerized search engine and components to implement the other disclosed logic, and so on. On the other hand, some embodiments could be configured to interface with a search engine such that the instructions only cause instantiation of the components to implement the other disclosed logic. Thus, an apparatus could include a memory; a non-transitory computer readable medium including computer executable instructions; and at least one processor, coupled to the memory and the non-transitory computer readable medium, and operative to execute the instructions to: obtain a plurality of electronic documents relevant to a query (e.g., from an external search engine); obtain, via computerized term embedding, from the retrieved documents, a plurality of most similar terms with respect to the query; for each of the most similar terms, determine a pervasiveness score and a relevance score; filter out, from the most similar terms, those of the terms that are pervasive, based on the pervasiveness score, those of the terms that are irrelevant, based on the relevance score, and those of the terms that are redundant; and output a top number of terms remaining in the most similar terms after the filtering, based on similarity to the query, as discriminative facets.

One or more embodiments of the invention, or elements thereof, can accordingly be implemented in the form of an apparatus/system including a memory and at least one processor that is coupled to the memory and operative to perform exemplary method steps. FIG. 15 depicts a computer system that may be useful in implementing one or more aspects and/or elements of the invention, also representative of a cloud computing node according to an embodiment of the present invention. Referring now to FIG. 15, cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 15, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Thus, one or more embodiments can make use of software running on a general purpose computer or workstation. With reference to FIG. 15, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 15) running a server program. It will be understood that such a physical server may or may not include a display and keyboard.

One or more embodiments can be at least partially implemented in the context of a cloud or virtual machine environment, although this is exemplary and non-limiting. Reference is made back to FIGS. 1-2 and accompanying text. Consider, e.g., a cloud-based service 96 (or one or more elements thereof) to provide unsupervised discriminative facet generation for dynamic faceted search and the like, located in layer 90.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks described. The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

One example of user interface that could be employed in some cases is hypertext markup language (HTML) code served out by a server or the like, to a browser of a computing device of a user. The HTML is parsed by the browser on the user's computing device to create a graphical user interface (GUI).

Exemplary System and Article of Manufacture Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   with a computerized search engine, retrieving a plurality of electronic documents relevant to a query;
   obtaining, via computerized term embedding, from said retrieved documents, a plurality of most similar terms with respect to said query;
   for each of said most similar terms, determining a pervasiveness score and a relevance score;
   filtering out, from said most similar terms, those of said terms that are pervasive, based on said pervasiveness score, the pervasiveness score being a probability of a given term appearing in a document related to the given term in the plurality of electronic documents relevant to the query, those of said terms that are irrelevant, based on said relevance score, the relevance score for the given term being a measure of popularity of the given term computed using a rank of documents where the given term is observed in the plurality of electronic documents relevant to the query, and those of said terms that are redundant to improve a relevance of query terms and reduce a quantity of the query terms;
   outputting a top number of terms remaining in said most similar terms after said filtering, based on similarity to said query, as discriminative facets; and
   with said computerized search engine, retrieving an updated plurality of electronic documents relevant to said query by resubmitting said query with at least one of said discriminative facets.

2. The method of claim 1, wherein determining said pervasiveness score comprises determining, for each of said most similar terms, a probability of a given one of said terms appearing in related documents of said term within said retrieved plurality of electronic documents.

3. The method of claim 1, wherein determining said relevancy score comprises determining, for each of said most similar terms, a popularity of a given one of said terms computed using ranks of those of said documents wherein said given one of said terms appears, within said retrieved plurality of electronic documents.

4. The method of claim 1, wherein filtering out, from said most similar terms, those of said terms that are redundant, comprises discarding a given one of said most similar terms responsive to determining that said given one of said most similar terms includes at least one non-functional token from a non-pervasive term previously selected as one of said facets.

5. The method of claim 1, wherein filtering out, from said most similar terms, those of said terms that are redundant, comprises determining whether those of said documents corresponding to a current one of said terms are already covered by another one of said terms.

6. The method of claim 1, wherein obtaining said plurality of most similar terms comprises applying cosine similarity.

7. The method of claim 1, wherein, in said step of outputting said top number of terms, said top number of terms does not exceed nine.

8. The method of claim 7, wherein obtaining said plurality of most similar terms comprises obtaining a number of said most similar terms as a maximum of:
   exceeding said top number of terms by at least one hundred; and
   being from twice to ten times said top number of terms.

9. The method of claim 1, further comprising, in said most similar terms, associating super terms with a corresponding base term to obtain a greedy document-term matrix, wherein said pervasiveness score and said relevance score are determined based on said greedy document-term matrix.

10. An apparatus comprising:
    a memory;
    a non-transitory computer readable medium including computer executable instructions; and
    at least one processor, coupled to the memory and the non-transitory computer readable medium, and operative to execute the instructions to:
    obtain a plurality of electronic documents relevant to a query;
    obtain, via computerized term embedding, from said retrieved documents, a plurality of most similar terms with respect to said query;
    for each of said most similar terms, determine a pervasiveness score and a relevance score;
    filter out, from said most similar terms, those of said terms that are pervasive, based on said pervasiveness score, the pervasiveness score being a probability of a given term appearing in a document related to the given term in the plurality of electronic documents relevant to the query, those of said terms that are irrelevant, based on said relevance score, the relevance score for the given term being a measure of popularity of the given term computed using a rank of documents where the given term is observed in the plurality of electronic documents relevant to the query, and those of said terms that are redundant to improve a relevance of query terms and reduce a quantity of the query terms;

output a top number of terms remaining in said most similar terms after said filtering, based on similarity to said query, as discriminative facets; and retrieve an updated plurality of electronic documents relevant to said query by resubmitting said query with at least one of said discriminative facets.

11. The apparatus of claim 10, wherein said at least one processor is operative to determine said pervasiveness score by determining, for each of said most similar terms, a probability of a given one of said terms appearing in related documents of said term within said retrieved plurality of electronic documents.

12. The apparatus of claim 10, wherein said at least one processor is operative to determine said relevancy score by determining, for each of said most similar terms, a popularity of a given one of said terms computed using ranks of those of said documents wherein said given one of said terms appears, within said retrieved plurality of electronic documents.

13. The apparatus of claim 10, wherein said at least one processor is operative to filter out, from said most similar terms, those of said terms that are redundant, by discarding a given one of said most similar terms responsive to determining that said given one of said most similar terms includes at least one non-functional token from a non-pervasive term previously selected as one of said facets.

14. The apparatus of claim 10, wherein said at least one processor is operative to filter out, from said most similar terms, those of said terms that are redundant, by determining whether those of said documents corresponding to a current one of said terms are already covered by another one of said terms.

15. The apparatus of claim 10, wherein said top number of terms does not exceed nine.

16. The apparatus of claim 15, wherein said plurality of most similar terms comprises a maximum of:

exceeding said top number of terms by at least one hundred; and being from twice to ten times said top number of terms.

17. The apparatus of claim 10, wherein said at least one processor is further operative to, in said most similar terms, associate super terms with a corresponding base term to obtain a greedy document-term matrix, wherein said pervasiveness score and said relevance score are determined based on said greedy document-term matrix.

18. An article of manufacture including a non-transitory computer program product comprising one or more computer readable storage media having stored thereon:

first program instructions executable by a computer system to cause the computer system to obtain a plurality of electronic documents relevant to a query;

second program instructions executable by the computer system to cause the computer system to obtain, via computerized term embedding, from said retrieved documents, a plurality of most similar terms with respect to said query;

third program instructions executable by the computer system to cause the computer system to, for each of said most similar terms, determine a pervasiveness score and a relevance score;

fourth program instructions executable by the computer system to cause the computer system to filter out, from said most similar terms, those of said terms that are pervasive, based on said pervasiveness score, the pervasiveness score being a probability of a given term appearing in a document related to the given term in the plurality of electronic documents relevant to the query, those of said terms that are irrelevant, based on said relevance score, the relevance score for the given term being a measure of popularity of the given term computed using a rank of documents where the given term is observed in the plurality of electronic documents relevant to the query, and those of said terms that are redundant to improve a relevance of query terms and reduce a quantity of the query terms;

fifth program instructions executable by the computer system to cause the computer system to output a top number of terms remaining in said most similar terms after said filtering, based on similarity to said query, as discriminative facets; and sixth program instructions executable by the computer system to cause the computer system to retrieve an updated plurality of electronic documents relevant to said query by resubmitting said query with at least one of said discriminative facets.

\* \* \* \* \*